United States Patent [19]

Barbier et al.

[11] Patent Number: 5,539,674

[45] Date of Patent: Jul. 23, 1996

[54] MINIMUM READING PRESSURE GAGE WITH DUAL FUNCTION SENSOR

[75] Inventors: William Barbier, Hazelwood; Andrew R. Chibnall, St. Louis, both of Mo.; Mudhukant Shah, Wheaton, Ill.

[73] Assignee: J/B Industries, Aurora, Ill.

[21] Appl. No.: 166,097

[22] Filed: Dec. 13, 1993

[51] Int. Cl.⁶ .............................. G01L 9/02; G01N 9/00
[52] U.S. Cl. .............................................. 364/558; 73/4 R
[58] Field of Search .................... 73/4 R, 4 V, 30.02; 364/558

[56] References Cited

U.S. PATENT DOCUMENTS 4,446,527  5/1986  Runyan .................................. 364/558

Primary Examiner—Edward R. Cosimano
Attorney, Agent, or Firm—Daniel Kramer

[57] ABSTRACT

An electronic device for observing temperature and pressure and for indicating pressure, especially very low pressures. The device has a single sensor element for responding to both temperature and pressure. The device includes a sequence timer for causing the device to first observe the resistance of the sensor when the device is first turned on. The timer then applies a voltage across the sensor, causing a known current to flow through the sensor. The current heats the sensor an amount corresponding to density and therefore the pressure of the gas to which it is exposed. A calculating device is provided for calculating the temperature from the observed value of the initial sensor resistance and the pressure from the observed values of current flow and subsequent sensor resistance. A display is provided for indicating the calculated pressure.

18 Claims, 5 Drawing Sheets

5,539,674

MINIMUM READING PRESSURE GAGE WITH DUAL FUNCTION SENSOR

BACKGROUND

1. Field of the Invention

The invention is directed to the field of electronic pressure gages and more particularly to electronic pressure gages employing a single sensor for sequentially reading first the temperature of the environment and second, the pressure of vapor surrounding the sensor. The invention is more particularly directed to the type of pressure gages employed to read very low pressures, typically in the range of 10,000 microns pressure to 50 microns pressure. The invention is further directed to such pressure gages which compare each reading to the reading immediately prior and store for later recall and display the value for the lowest pressure observed.

2. Related Art

Pressure gages for measuring the pressure of gasses or vapors within a chamber or space have long been known. Until recently, pressures were most commonly measured by comparing an unknown pressure with a known pressure. Torricelli employed a mercury column to measure the pressure of the atmosphere about 1653.

Though he may not have realized it, the known pressure against which he measured the pressure of the atmosphere was the vapor pressure of mercury at its then temperature. To improve portability, a flattened, curved tube, called a Bourdon tube after its inventor was developed as a pressure sensor. The curved Bourdon tube has a tendency to straighten when pressure inside is increased over the pressure outside. This Bourdon tube is presently used as an actuator in pressure gages and pressure switches. Gages employ a mechanical linkage tied to one end of the Bourdon tube which moves a pivoted pointer over a circular scale. Pressure switches employ the movement of free end of the Bourdon tube to actuate a switch. In most cases the Bourdon tube is surrounded by air at atmosphere pressure. In these applications, atmospheric pressure is the reference.

However, where the value of the pressure must be known with greater accuracy the use of atmospheric pressure as a reference is unsatisfactory. This is especially true in the measurement of atmospheric pressure itself and in the measurement of very low pressures, so-called vacuums. In a relatively costly but accurate design of vacuum gages, a sealed chamber is provided having a flexible member, such as a diaphragm or bellows, embedded in a wall of the chamber and subject both to the pressure within the chamber and the pressure outside. The chamber is evacuated and the force on the diaphragm or bellows balanced with a spring. Changes in the pressure outside the chamber are reflected in a movement of the bellows. This movement is used to actuate a pointer or switch.

Where extreme accuracy is required, recent technology provides an electrical gage output. Here a strain gage, rather than a linkage and moving pointer, is the primary output device. A strain gage is an electrical transducer element whose electrical resistance changes with the stress on it. The resistance of the strain gage is observed as a voltage change across the strain gage within which a constant flow of a small current has been established. The observed voltage is translated to a pressure expressed in the required units by a calculating procedure.

The voltage across the strain-gage is an analog quantity. Most frequently, the analog voltage is employed to calculate an analog pressure value by the use of an amplifier. This is then presented to an observer as the movement of a meter calibrated in pressure units, or is translated to digital form by the use of an electronic integrated circuit known as an analog to digital converter or A/D converter. The output of the A/D converter, being digital, can be displayed by being fed into a display through the proper driver, or into a computer for further processing. The display driver simply takes the digital value of the pressure to be displayed and tells the display what dots or bars are to be illuminated so that the desired digits are visually displayed.

Where laboratory accuracy is not required, for instance for service purposes, the density and therefore the pressure of the monitored gas is frequently monitored by measurement of the gas temperature and the simultaneous measurement of the ability of the low pressure gas to carry heat away from a heated element. This heat transfer ability of a gas is functionally related to its density. It is known that as the pressure of a gas is reduced, its density and therefore its ability to conduct heat away from a heat source is reduced. Its density, in turn, is related to both its temperature and its pressure. The gas temperature is measured by monitoring the resistance of an electrical element whose electrical resistance changes in a predictable way with its temperature.

One such element is a bobbin wound with platinum wire. A second, more economical but less accurate element used for the same purpose is a diode of germanium or other material whose electrical resistance changes with temperature. Thermistors are commercially available devices whose electrical resistance changes in a predictable way with their temperature. Thermistors are frequently used as temperature sensing elements. Manufacturers of thermistors publish charts and equations setting forth the resistance—temperature relationship of their products.

In vacuum gages of current design, two sensors are employed simultaneously, one for measuring the actual temperature of the gas whose pressure is to be measured, the second for measuring the ability of the low pressure gas to carry heat away from a heated element, and thereby the density of the gas. The heated element can be of the same type as the element being employed to measure the temperature of the gas or may be of a different type.

In one of the more common designs the two sensors are electrically arranged in a thermopile or in a Wheatstone or other bridge arrangement whereby the ratio of the electrical resistances of the two elements, one heated—one not heated, can be compared. The heat is supplied to the heated element by a heater external to it but in effective heat transfer relation ship to it.

In another common design the heat is supplied to the heated thermistor by passing a flow of electricity through it, a so-called self-heating design. However, in both of the vacuum gage designs employing two elements, the characteristics of each element must be known with accuracy and the characteristics built into the measurement algorithms. Matched components are available but the cost of these matched components is high. Further, no two elements, even matched elements, are truly identical, and the inherent differences between the matched elements produce inherent design inaccuracies. These must be addressed by known technologies requiring calibration of both thermistors and incorporation of both their calibration curves into the hardware or software or both to provide the desired accuracy of pressure measurement.

Therefore it is an objective of the present invention to provide a simple yet accurate pressure gage for measuring vacuum or low gas pressures over the range of 10,000 microns to 50 microns (a micron is a pressure imposed by a mercury column having a height of 1/1000 of a millimeter).

It is a further objective to provide such a pressure gage having a single sensor.

It is a further objective of the present invention to provide such a device where the single sensor is employed to measure both the temperature and the density of the gas, seriatim.

It is a further objective of the present invention to provide at least one memory in which the value of the current pressure is stored.

It is a further object of the present invention to compare each successive reading of pressure with the stored reading and to replace the stored reading with the later reading, on the condition that the later reading represents a lower pressure than the stored reading.

It is a further object of the present invention to display the current reading and, on an operators action to start an interval timer and to display for a time period the lower stored reading without erasing it from memory.

It is a further object to continue displaying successive pressures as they are measured, after the lower stored reading has been displayed for the timed period.

It is a further objective to store the value of the lowest observed pressure in a non-volatile memory which will survive the deactivation of the unit by a manual switch or an integral or an external timer and to allow display of the lowest pressure at a later time.

SUMMARY OF THE INVENTION

An absolute pressure reading apparatus having a temperature and pressure reading cycle and including single transducer means for responding both to temperature and to pressure within the cycle.

The cycle is arranged first to measure temperature once; second to measure and display pressure repeatedly.

The apparatus includes a first display for exhibiting the pressure, a first and a second memory for storing numerical values, transducer means positioned within a space having a temperature and a pressure to be measured, the transducer means having an electrical resistance functionally related to its temperature. Switch means are provided for starting the cycle. Means for establishing the timed cycle and for establishing a sequence of operations within the timed cycle are also provided.

Means are provided for measuring the initial resistance of the transducer means without significant heating effect as a first step after the cycle is started.

Means are provided for employing the measured resistance of the transducer means and its functional relationship between resistance and temperature to calculate a temperature related value of the transducer means and to store the calculated temperature related value in the first memory.

After the first step has been completed, means are provided for passing a predetermined current through the transducer means for heating it. Further means are provided for measuring the resistance of the heated transducer means and calculating the pressure from the temperature related value stored in the first memory and the resistance of the heated transducer. Further means are provided for transmitting the calculated pressure to the display for displaying it.

BRIEF DESCRIPTION OF THE DRAWINGS

The foregoing summary, as well as the following description of the preferred embodiments, will be better understood when read in conjunction with the appended drawings. For the purpose of illustrating the invention, there is shown in the drawings an embodiment which is presently preferred, it being understood, however, that the invention is not limited to the specific instrumentalities or the precise arrangement of elements disclosed.

DETAILED DESCRIPTION OF THE INVENTION

Figure 1:
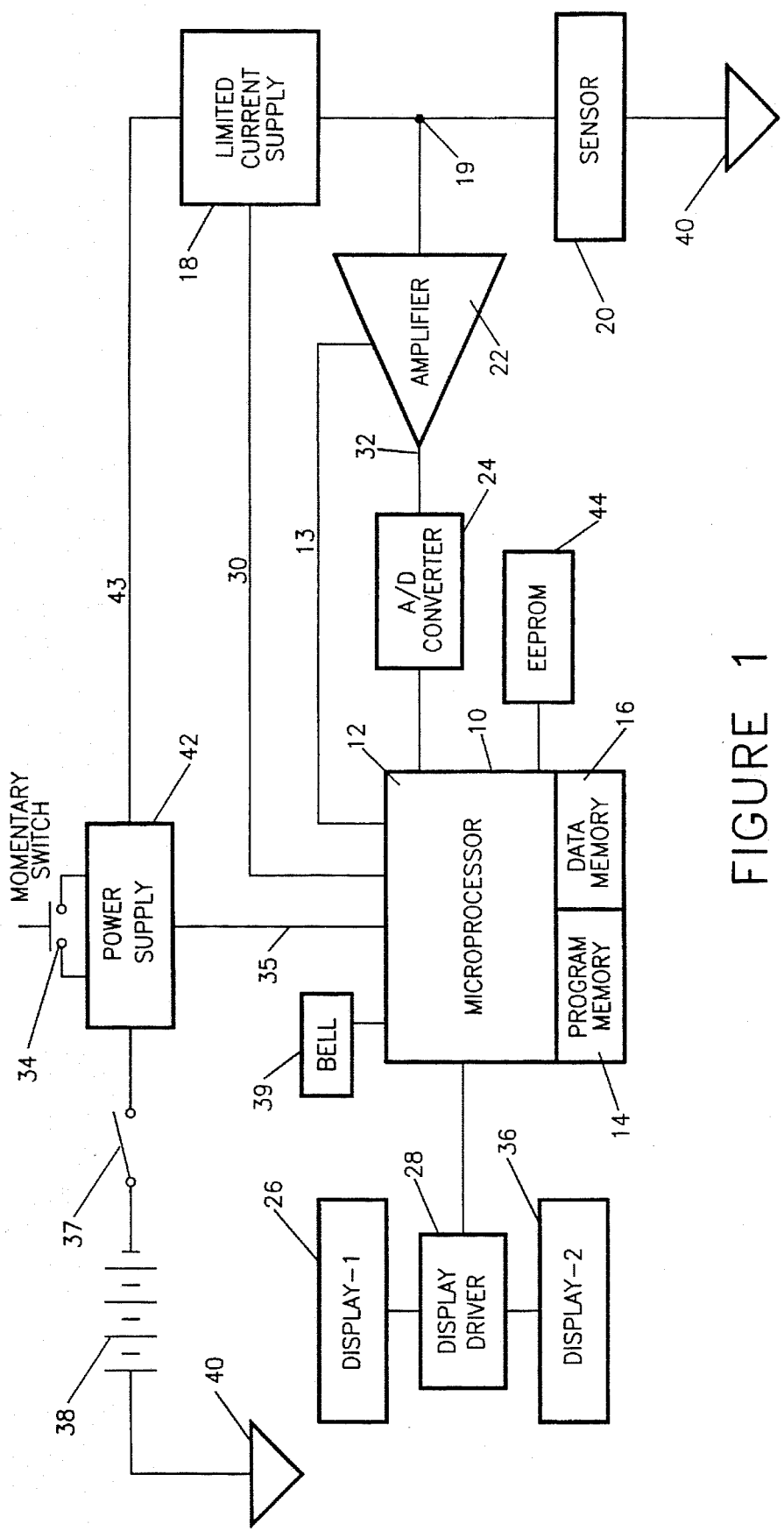
FIG. 1 is a block electrical schematic diagram showing the major components and their logical interconnection modes.
Figure 2:
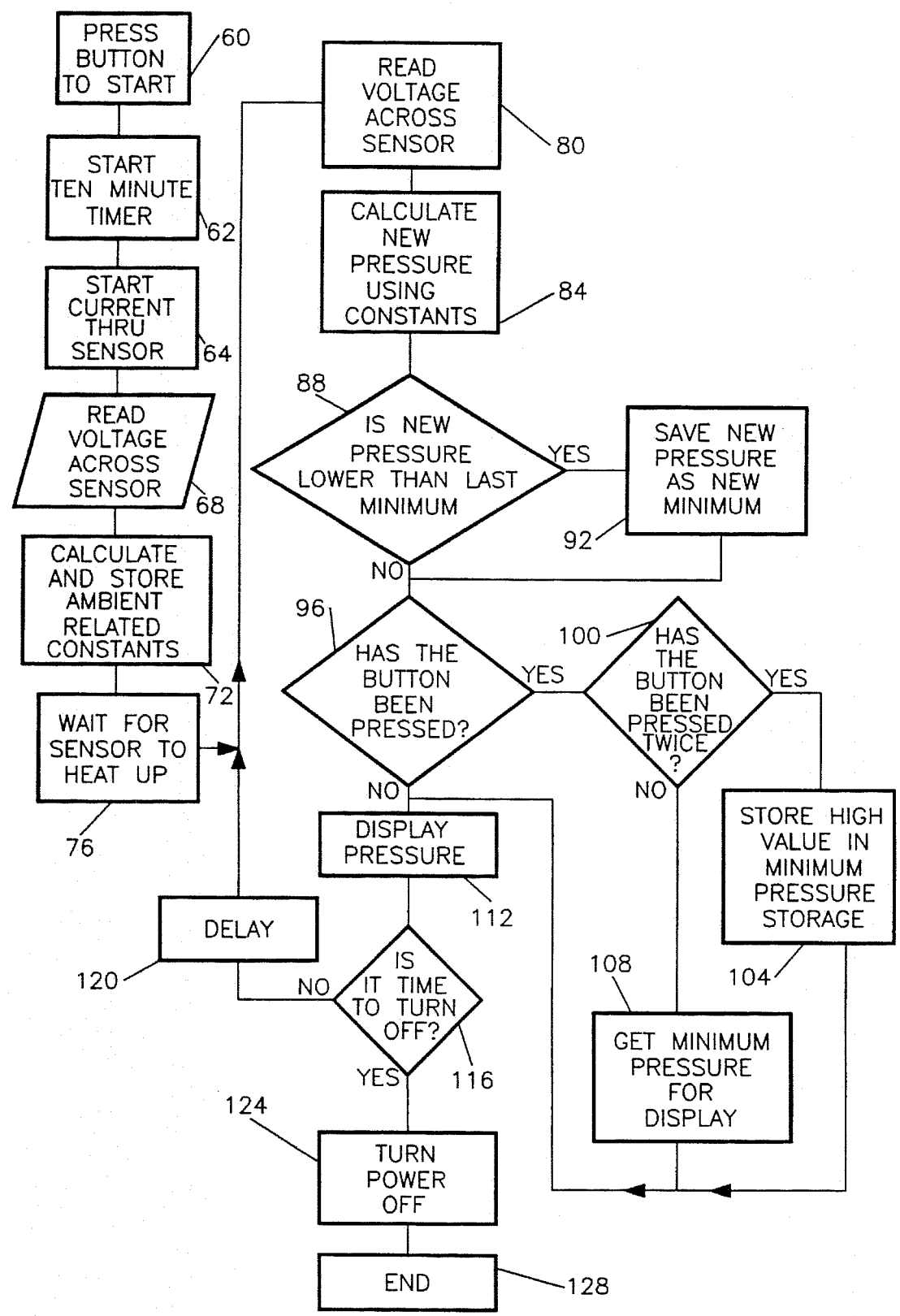
FIG. 2 is a block logical diagram illustrating the sequence of events as established by the stored program, including the logic and the timing circuits in the preferred embodiment.

Referring now to the drawings, wherein like references are used to indicate like elements, there is shown in FIG. 1 a block diagram of the major electronic and display elements and groups employed in the performance of the present invention and in FIG. 2 a block diagram of the logical algorithm which the apparatus of the present invention employs to achieve its objective.

In the preferred embodiment, sensor 20 is immersed in the gas whose temperature and pressure are to be measured. Sensor 20 is a thermistor having an electrical resistance whose value decreases as its temperature increases. Many manufacturers offer such thermistors and they are available for use over a wide range of temperatures. An example of a thermistor suited for application in the present invention is a model G-126 manufactured by Fenwal Electronics of Framingham, Mass. having a nominal resistance of 2000ohms at 25 C. and having a well-established relationship between temperature and resistance.

Engineers of ordinary skill in the electronic arts pertaining to this invention will select a thermistor having the temperature—resistance relationship, the heat dissipation limit and the precision of the temperature—resistance relationship desired for their purpose.

Switch 34, when momentarily closed, is employed to initiate the timing procedure which provides the output desired, and to provide a continuing power supply to the operative components by way of logical interconnections 35 and 43, and common connections 40 during a timed period. At the instant switch 34 is initially closed after a period of disuse, limited current power supply 18 supplies a predetermined current flow through thermistor sensor 20. The voltage across thermistor—sensor 20 is observed and scaled by an amplifier 22 having a gain which is adjusted by feedback from microprocessor 12 through conductor 13.

Microprocessor 12 is part of a single integrated circuit having several active functional zones. In the case of the present invention, the integrated circuit is a 16C56 dual inline package (DIP) 10 having three main functional areas. There is a microprocessor 12 into which data is read and which calculates and provides output for storage, for visual display or for feed back to another device. Within the DIP 10 there is also a program storage area 14. Program storage area 14 is a non-volatile read-only memory or ROM into which a program, specific to the functioning of the vacuum gage of the present invention, has been permanently burned. The program directs the microprocessor to read data, to calculate, to store data, to increment timers and to take other actions. Finally, there is a Data memory 16 for temporary data storage. Data memory 16 is volatile and its contents are erased whenever power is interrupted. In other embodiments a portion of the non-volatile storage is also used for data storage, including storage of pressure related values.

In an alternative embodiment of the present invention, the program memory 14 and the data memory 16 are located in integrated circuit components separate from the microprocessor.

In addition to integrated circuit 10 there is a EEPROM 44. An EEPROM is an electrically erasable memory whose contents are not volatile and remain intact after power has been turned off, for later reading when power is restored. Though its memory is non-volatile like the memory 14 into which the program has been burned, the EEPROM is different in that the memory in any of all of the memory registers can be erased or changed by an instruction from the microprocessor 12.

In an alternative embodiment of the present invention, memory 44 is volatile but includes means such as a battery for maintaining power to the otherwise volatile memory even after the main power supply has been turned off.

Finally, there is a digital display 26 having a driver 28 which receives a binary output from the microprocessor 12 and converts the binary output into a form which the display 26 shows as recognizable numerals or letters.

Referring now to FIGS. 1 and 2. At the start, following an off period, an operator presses and releases momentary contact switch 34. The momentary closing of the switch 34 (step 60) causes a transistor within the power supply 42 to conduct and supply power to the entire circuit from battery 38 (step 64). In other embodiments of the invention, power is secured from an alternating line source and reduced in voltage and rectified and filtered in ways that are well known to those of ordinary skill in the electronic arts. The transistor in power supply 42 bypasses the switch 34 so that the power circuit is maintained even after the switch 34 contacts open. At the same instant that limited current supply 18 begins to supply the flow of current to sensor 20, but before any appreciable heating of the sensor 20 can occur, the voltage at point 19 across sensor 20 is observed by scaling amplifier 22 (step 68). The gain of scaling amplifier 22 has been sharply reduced by microprocessor 12 via conductor 13 for this initial reading because it expects to find sensor 20 at room temperature or about 20 C. (68 F.). At this condition, the resistance of sensor 20 is high and its voltage at point 19 is also relatively high.

The voltage at point 19, having been scaled by scaling amplifier 22 is fed to A/D converter 24 where its scaled analog value is converted to an equivalent digital value and transmitted to microprocessor 12.

In an alternate embodiment of the present invention, the microprocessor 12 instructs the limited current source 18 via line 30 to initially limit the current flow through sensor 20 to a first low value, such that the heating effect on sensor 20 is small. Then after the ambient constants (step 72) have been calculated, the microprocessor 12 instructs limited current source 18 to increase the current flow to a second higher value (step 76), to provide faster heating of sensor 20.

Now having received, in digital form, the voltage across the sensor 20 at the initial room temperature condition, and employing stored calibration constants applicable to the sensor 20 at this condition, the microprocessor 12 calculates a ambient temperature related set of constants (step 72). It will employ this ambient temperature related set of constants later in the calculation of actual pressure (step 84) at sensor 20 when the sensor has been heated to an equilibrium temperature consistent with the limited current flowing through it and with the heat dissipating characteristics of the gas surrounding it. The microprocessor stores this second set of constants in the volatile storage area 16 of DIP 10. It is appropriate that it do so since these are calculated anew each time the instrument is turned on or each time a new measurement cycle is automatically initiated.

At the moment switch 34 is pressed to begin an on cycle following a prior off cycle, microprocessor 12 begins a first timing cycle (step 62). This first timing cycle (step 62) typically has a ten minute duration, at the end of which the microprocessor 12 instructs the transistor within the power supply 42 to open, stopping flow of current to the entire instrument (step 124), until switch 34 is again pressed by an operator to restart another ten minute operating cycle.

The microprocessor 12, having calculated and stored the temperature based operating constants (step 72), following the instructions stored in ROM 14, now begins a second timing function (step 76), during which it allows sufficient time for sensor 20 to reach an equilibrium temperature. In the case of the relatively small G-126 thermistor, which is only 0.014 inches (0.36 mm) in diameter and is mounted on platinum-iridium wires only 0.001 inches (0.025 mm) in diameter, the time to equilibrium temperature is typically in the range of 10 to 20 seconds.

When this second timing function has completed the stored program residing in the non-volatile program storage area 14, instructs the microprocessor 12 to read the voltage on sensor 20 (step 80), transmitted to it by A/D converter 24. The sensor voltage had first been scaled by amplifier 22, whose gain has been adjusted by microprocessor 12 via conductor 13 to bring it within a usable range. The microprocessor 12 now calculates the pressure (step 84) from the constants stored in volatile memory 16. In its most straightforward mode the microprocessor first calculates the gas density at the sensor 20 and then, factoring in the initially observed temperature, calculates the pressure. In practice, however short-cuts, known to programmers of ordinary skill, are employed to allow the simplest microprocessor to perform the calculation in the shortest time.

The microprocessor 12 then compares the newly calculated pressure at sensor 20 with the pressure value stored in EEPROM 44 (step 88). This pressure value had been unchanged from the lowest pressure stored in EEPROM during the immediately prior operating cycle or reading. The operator can read this stored pressure value on the display by pressing switch 34 once following the turn-on step. The button press is observed at step 96 (inquiry is "yes"), analyzed as a single press at step 100 (inquiry is "no"), the minimum pressure is read from the EEPROM (step 108) and displayed (step 112). However, if the comparison (step 88) shows the observed pressure value to be higher than the stored pressure value, step 88 provides a 'no' response and the new pressure is not saved as the new minimum (step 92). Steps 96 and 100, having detected a single press of switch 34, therefore cause the microprocessor 12 to read the stored minimum pressure for display (step 108) and send the minimum pressure data to display driver 28 (step 112). The display driver is a microprocessor which is matched to the display 26 and has been programmed by the manufacturer to receive an input as a binary string and to deliver to the display instructions to illuminate the bars and dots of the display to create the numeral or character equivalent to the binary input.

However, if the newly observed pressure value (step 84) is lower than the pressure value stored in EEPROM, then the microprocessor substitutes the newly observed pressure value in the EEPROM 44 in place of the old pressure value (step 92).

The operator has, during the ten minute operating cycle, the ability to observe the pressure value stored in EEPROM 44. He does this by pressing switch 34 momentarily once. This press of switch 34 is sensed at logical step 96 (HAS THE BUTTON BEEN PRESSED?) which refers to the action to logical element 100 (HAS THE BUTTON BEEN PRESSED TWICE?). The action of pressing switch 34 during the course of a ten minute operating cycle starts a third timing cycle whose duration is typically 1.5 seconds. During this 1.5 second period, the pressure value stored in EEPROM is read by the microprocessor (step 108) and sent for display to the display driver 28 (step 112). However, if during the course of this 1.5 second timing cycle the operator presses switch 34 twice, (steps 100, 104) the microprocessor understands this (step 104) as an instruction to reset the pressure value stored in EEPROM to a very high value, typically a pressure greater than 760 mm of mercury, ordinary atmospheric pressure and display this high pressure (step 112).

Following each display step 112, the microprocessor consults the first timing cycle to determine if ten minutes has elapsed. (step 116) If not, it activates a fourth timing cycle (step 120), typically in the range of one half to two seconds long, following which microprocessor 12 again reads the voltage on the sensor 20 (step 80). If at step 116, it finds that the first timing cycle has timed out and that its ten minute duration has expired, the microprocessor tells the hold-in transistor in the power supply to turn off the instrument.

Figure 5:
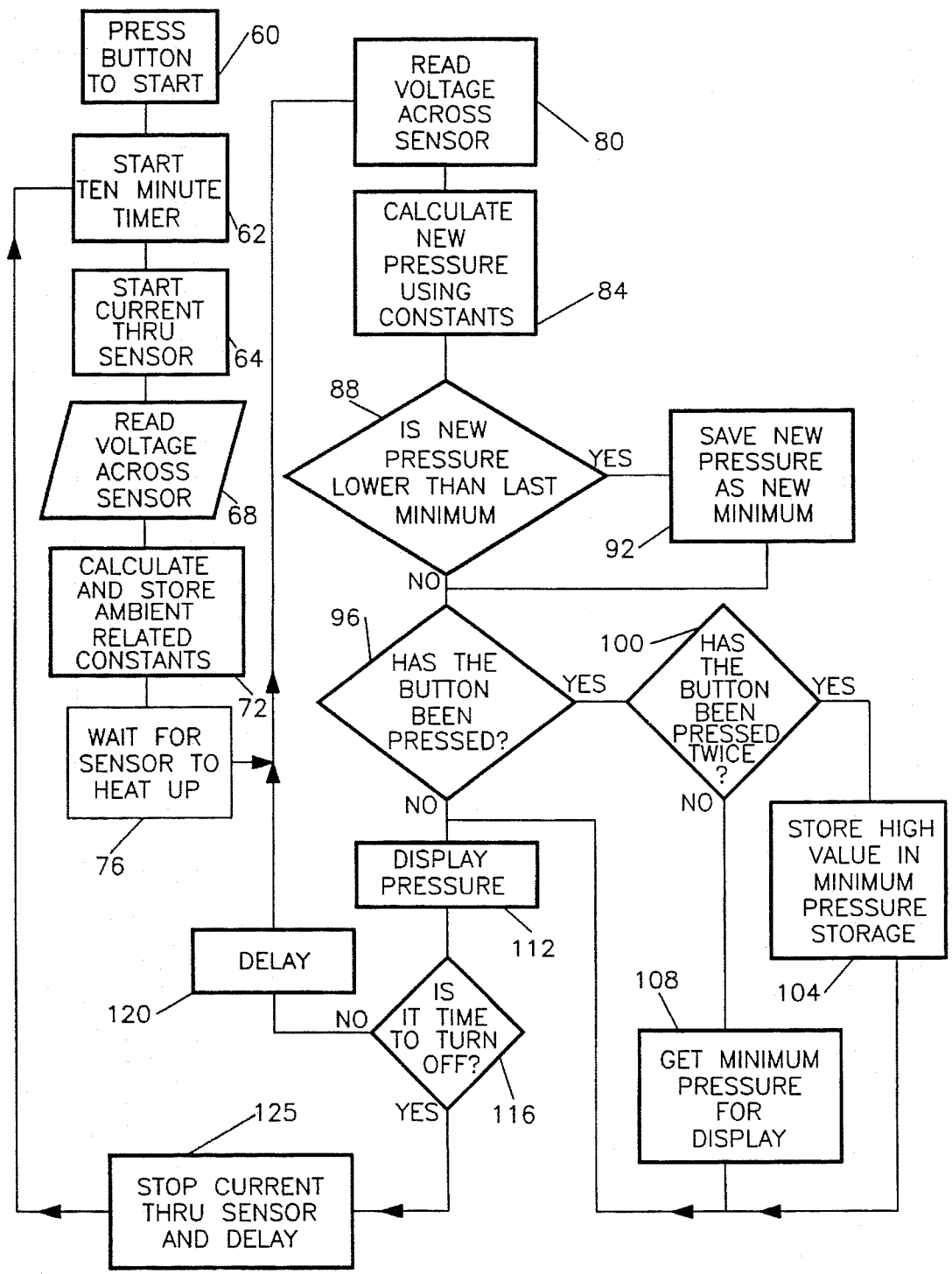
FIG. 5 is a block logic diagram similar to that of FIG. 2 but showing an alternate embodiment including automatic means for establishing repeated measuring cycles.

In an alternative embodiment of the present invention represented in FIG. 5, at step 116 the microprocessor does not turn off the system but instead actuates a time delay (step 125) during which the current to the sensor 20 is turned off for a period sufficiently long for the temperature of the sensor 20 to reach temperature equilibrium with its surrounding ambient, typically a period of 3 minutes. At the end of this time delay period microprocessor 12 automatically initiates a new cycle beginning at step 62.

In an alternative embodiment of the present invention, the momentary contact switch 34 is replaced with a switch 37 in series circuit with the power supply.

In an alternative embodiment of the present invention, the non-volatile memory 44 is omitted and the contents of the low pressure memory are lost when power is removed from the circuit.

Referring to FIG. 1, in an alternative embodiment of the present invention, two displays are provided, where the second display 36 constantly displays the lowest pressure value stored in EEPROM 44. In such a construction the program portion, requiring a button press (100) to display (108) the stored lowest pressure value, is eliminated.

In another alternative embodiment of the present invention, two switches 34 are provided for the separate functions of displaying the stored pressure value and of resetting the EEPROM stored pressure value to the highest.

In still another embodiment of the present invention the microprocessor 12 alternately sends to the display 26 the lowest pressure stored in EEPROM 44 and the currently observed pressure.

Figure 3:
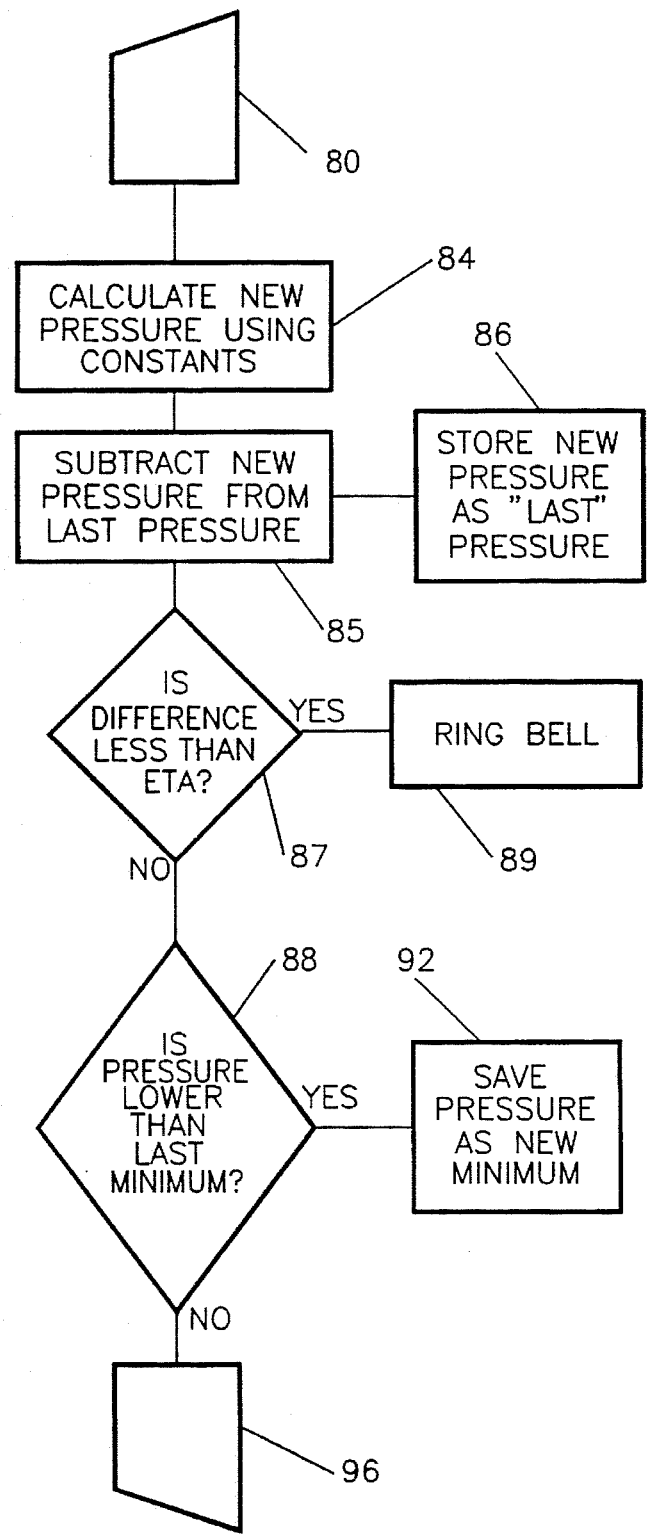
FIG. 3 is a partial block diagram which is a modification of the block diagram of FIG. 2 and comprises another embodiment of the invention.

In still another embodiment of the present invention, represented by the block diagram of FIG. 3, the microprocessor temporarily stores each reading (step 86) and subtracts each reading from the stored prior reading (step 85). It then compares the difference between the two successive readings with a predetermined constant, Eta (step 87). If the difference between the two readings is larger than the predetermined difference, Eta, the program proceeds to the next step 88. This and the subsequent steps are identical to those set forth in FIG. 2. However, if the difference between the two successive readings is smaller than the predetermined amount, then the microprocessor directs that an audible or visual signal such as lighting a light or ringing a bell (39) (step 89) be given to alert an operator that the vacuum pump can produce no lower pressure.

After evacuation is completed, the vacuum pump is turned off by the operator. The pressure then rises in the evacuated space; initially rapidly, subsequently, more and more slowly. If the instrument is left in operation after the vacuum pump is turned off, employing the logical arrangement of FIG. 3 it will monitor the pressure rise and alert the operator when the pressure has stabilized. This feature permits the operator to perform other tasks while awaiting equilibrium in either the evacuation phase or the post-evacuation phase, while being alerted when each phase is complete.

Figure 4:
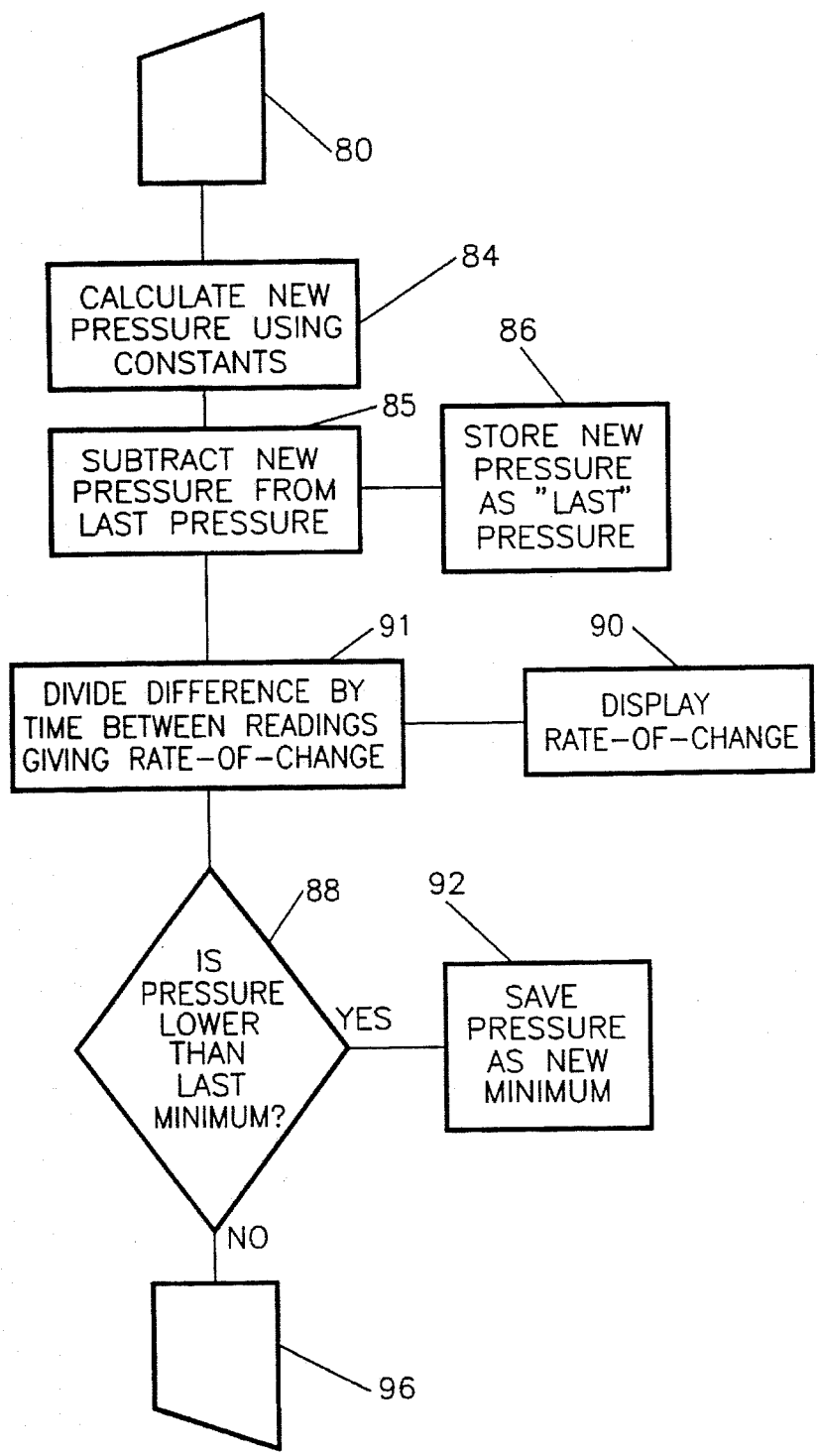
FIG. 4 is a partial block diagram which is a modification of the block diagram of FIG. 3 showing still another embodiment of the invention.

In still another embodiment of the present invention having steps similar to those of FIG. 3 and shown in FIG. 4, the difference between two successive readings (step 91) is divided by the elapsed time between the two readings (step 91). This quotient is the instantaneous rate of pressure change. In this embodiment, the currently observed absolute pressure is displayed in display 26 (step 90, FIG. 4) and the rate of pressure change is displayed in display 36 of FIG. 1. During evacuation, the rate of change is an indication of the nearness to the desired evacuation endpoint. After the pump is shut off, the rate of change, if constant, suggests the presence of a leak and provides an indication of the size of the leak causing the pressure rise. If the rate of change decreases, the pressure rise may be only from normal out-gassing.

In another embodiment of the present invention having a single display switch 34 is employed to toggle between the currently observed absolute pressure and the rate of change.

In still another embodiment the microprocessor 12 causes the currently observed absolute pressure and the rate of change to be observed alternately.

From the foregoing description, it can be seen that the present invention comprises an improved pressure-vacuum gage employing a single sensor for both temperature and pressure measurement. It will be appreciated by those skilled in the art that changes could be made to the embodiments described in the foregoing description without departing from the broad inventive concept thereof. It is understood, therefore, that this invention is not limited to the particular embodiment or embodiments disclosed, but is intended to cover all modifications which are within the scope and spirit of the invention as defined by the appended claims.

We claim:

1. Electric apparatus for displaying gas pressure measured at a point, the gas having an ambient temperature and a density, the apparatus comprising, a first data memory (16) for storing ambient temperature related values, a second data memory (44) for storing minimum pressure related values, single transducer means (20) positioned at the point for responding both to ambient temperature and to gas density, the transducer (20) having an electrical resistance functionally related to its temperature, switch means (34) for starting a cycle, means (12,14) for timing and for establishing a sequence of pressure measurement operations within the cycle, means (12,18,22,24,42) for measuring the resistance of the transducer means at the start of the cycle, means (12,14)(68,72) for employing the measured resistance of the transducer means and the functional relationship between the transducer resistance and temperature to calculate ambient temperature related values of the transducer means and to store the calculated temperature related values in the first data memory (16), means (42,18) for passing a current through the transducer means for heating it whereby the transducer assumes a temperature related to the gas density at the point, and means (12,22,24) (80,84) for measuring the resistance of the heated transducer means and calculating therefrom (12,16,44) a value related to the pressure at the point from the ambient temperature related value stored in the first data memory (16) and the density related resistance of the heated transducer, further including display means (26) and means (28) for transmitting the calculated pressure related value to the display means whereby the pressure related value is displayed.

2. Gas pressure measuring and displaying apparatus as recited in claim 1, further providing that among the sequence of operations provided within the cycle are means (14,12) (116,125) for stopping current flow to the transducer means for a time period and means (62,125) for subsequently beginning a new cycle.

3. Gas pressure measuring and displaying apparatus as recited in claim 1, further including means (FIG. 2) for reading, calculating and storing a first set of calculated pressure related values, and means (FIG. 2) for reading and calculating a second set of pressure related values, and means (FIG. 3) for securing the difference between the first and the second pressures corresponding to the first and second pressure related values and means (14,12,28,36) for displaying the pressure difference.

4. Gas pressure measuring and displaying apparatus as recited in claim 3, further providing, means (12) for measuring the time interval between a first and a second reading, means (12) (91) for dividing the pressure difference between the first and second readings by the time interval, whereby a time rate of pressure change is obtained and means (28,36) (90) for displaying the time rate of change.

5. Gas pressure measuring and displaying apparatus as recited in claim 3, further providing a device (39) requiring activation;

means (12,14) for defining and storing a difference value, means (12) (87) for comparing each successive difference value with the defined value, and means (87,89) for activating the device when any difference value has an established relationship with the defined value.

6. Gas pressure measuring and displaying apparatus as recited in claim 1, further including means (100,104) for storing initial pressure related values in the minimum pressure data memory (44) and means (88) for comparing the pressure corresponding to each set of newly calculated pressure related values with the pressure corresponding to the pressure related values stored in the minimum pressure data memory (44), and further providing means (12,14,44) (88,92) for storing in the minimum pressure data memory (44) the newly observed pressure related values, on the condition that the newly observed pressure related values represent a lower pressure than the pressure represented by the pressure related values already stored in the minimum pressure data memory (FIGS. 1,2), and further providing means (96,100,108) for transmitting the pressure related value stored in the minimum pressure data memory (44), to the display means for temporary display thereon.

7. Gas pressure measuring and displaying apparatus as recited in claim 6, further providing, second display means (36) and means (12,14) for causing the contents of the minimum pressure data storage (44) to be displayed continuously as a pressure in the second display means (36), whereby both the newly observed pressure and the stored lowest observed pressure are simultaneously visible.

8. Gas pressure measuring and displaying apparatus as recited in claim 6, including means (14,12) (116,124,128) for ending the cycle, and further providing that the minimum pressure data memory (44) includes means for retaining its pressure related values after the end of the cycle.

9. Gas pressure measuring and displaying apparatus as recited in claim 6, where the means (34) for causing the temporary display of the minimum pressure are the switch means.

10. Gas pressure measuring and displaying apparatus as recited in claim 9, where the switch means (34) for causing the temporary minimum pressure display is the same switch means used for starting the cycle.

11. Gas pressure measuring and displaying apparatus as recited in claim 9, further providing that among the sequence of operations provided within the cycle are means (14,12) (116,124) for ending the cycle.

12. Means for displaying gas pressure measured at a point and generating pressure related values, the gas having a temperature and a density, the means comprising:

display means (26), a data memory (44) for storing pressure related values including values related to minimum pressure, transducer means (20) positioned at the point for responding to gas density, the transducer means having an electrical resistance functionally related to its temperature, clock means (12) for establishing a repeating cycle, means (12,18,42) for heating the transducer means, means within the cycle for measuring (12,18,22,24,42) a first and a second resistance of the heated transducer means and for calculating (12) a first and a second value related to the pressure at the point employing in the calculation the resistance of the heated transducer means, means (28,26) for converting the first pressure related value to an observable pressure value and for storing it in the data memory and for displaying it, means (44) for converting the second pressure related value to an observable pressure value and for comparing the second pressure value with the stored value, and means for replacing the stored value with the second pressure value on the condition that the second pressure value represents a lower pressure than the pressure represented by the stored value and further providing means (34,28,26) (96,100,108,112) for causing the pressure related values stored in the minimum pressure data memory (44) to be temporarily displayed in the display means as a pressure.

13. Gas pressure measuring and displaying means as recited in claim 12 where the means (34) for causing the temporary display of the minimum pressure are switch means.

14. Gas pressure measuring and displaying means as recited in claim 12, further providing second display means (36) and means (12,14) for causing the contents of the minimum pressure data storage to be displayed continuously as a pressure in the second display means whereby both the currently observed pressure and the past lowest observed pressure are simultaneously visible.

15. Gas pressure measuring and displaying means as recited in claim 12, further providing that the data memory (44) for storing the minimum pressure related value is non-volatile.

16. Gas pressure measuring and displaying means as recited in claim 12, further including means for reading, calculating and storing a first calculated pressure related value, means for reading and calculating a second pressure related value, means (85) for securing the difference between the first and the second pressures corresponding to the first and second pressure related values and displaying said difference.

17. Gas pressure measuring and displaying means as recited in claim 16, further providing a device requiring activation (39), means (14) for defining and storing a pressure difference value, means (12,87) for comparing each successive pressure difference value with the defined value, and means (12,87) for activating the device when any pressure difference value has an established relationship with the defined value.

18. Gas pressure measuring and displaying means as recited in claim 16, further providing means (14,12) for measuring the time interval between each first and second reading, means (14,12) (91) for dividing the pressure difference between the first and second readings by the time interval, whereby a time rate of pressure change is obtained and means (28,36) (90) for displaying the time rate of change.

\* \* \* \* \*